(12) United States Patent
Abrahamson

(10) Patent No.: US 7,923,077 B2
(45) Date of Patent: Apr. 12, 2011

(54) CONTINUOUS METHOD FOR PRODUCING INORGANIC NANOTUBES

(75) Inventor: John Abrahamson, Christchurch (NZ)

(73) Assignee: Canterprise Ltd., Christchurch (NZ)

(*) Notice: Subject to any disclaimer, the term of this patent is extended or adjusted under 35 U.S.C. 154(b) by 0 days.

(21) Appl. No.: 12/397,912

(22) Filed: Mar. 4, 2009

(65) Prior Publication Data

US 2009/0291042 A1    Nov. 26, 2009

Related U.S. Application Data

(63) Continuation of application No. 10/509,721, filed on Jun. 30, 2005, now abandoned.

(51) Int. Cl.
*H05H 1/48* (2006.01)
*C09J 7/02* (2006.01)

(52) U.S. Cl. ......... 427/580; 977/742; 977/844; 204/164

(58) Field of Classification Search ........................ None
See application file for complete search history.

(56) References Cited

U.S. PATENT DOCUMENTS

| | | | | |
|---|---|---|---|---|
| 6,091,612 | A | * | 7/2000 | Blankenship ................... 363/45 |
| 6,103,033 | A | * | 8/2000 | Say et al. ...................... 156/73.1 |
| 6,413,487 | B1 | * | 7/2002 | Resasco et al. ............ 423/447.3 |
| 2002/0018745 | A1 | * | 2/2002 | Herman ..................... 423/447.1 |

FOREIGN PATENT DOCUMENTS

WO    WO01/85612    * 11/2001

OTHER PUBLICATIONS

Guo, "Catalytic growth of single-walled nanotubes by laser evaporation", Chem Phys Letters, 243, (1995) 49-54).*
Lai ("Synthesis of carbon nanotubes using polycyclic aromatic hydrocarbons as carbon sources in an arc discharge", Materials Science and Engineering C, 16 (2001) 23-26).*

* cited by examiner

*Primary Examiner* — Timothy H Meeks
*Assistant Examiner* — Joseph Miller, Jr.
(74) *Attorney, Agent, or Firm* — Dann, Dorfman, Herrell and Skillman, P.C.

(57) ABSTRACT

Production of nanotubes of carbon or of other inorganic material by moving a carbon-containing substrate, such as a tape or belt of carbon fibers, within a reaction chamber either though an electric arc in a gap between two electrodes or adjacent an electrode so that an electric arc exists between the electrode and the substrate, to cause the nanotubes to form on the substrate. The method enables the continuous or semi-continuous production of nanotubes. Preferably, the process is carried out at atmospheric pressure and nanotubes of high purity are produced.

32 Claims, 3 Drawing Sheets

US 7,923,077 B2

CONTINUOUS METHOD FOR PRODUCING INORGANIC NANOTUBES

REFERENCE TO PRIOR APPLICATION

This application is a continuation of U.S. application Ser. No. 10/509,721, filed Jun. 30, 2005, now abandoned the entirety of which is incorporated herein by reference.

FIELD OF INVENTION

The invention relates to a method for producing nanoscale hollow fibrils or nanotubes of an inorganic material, such as carbon nanotubes.

BACKGROUND

In 1978 Abrahamson et al reported finding nanoscale hollow fibrils or tubular fibres on anodes after an arc discharge in nitrogen—Abrahamson J., Wiles P, "Carbon fibre layers on Arc electrodes—their Properties and Cool-Down Behaviour", Carbon, vol 16, 341-349, (1978). In 1991 S. Iijima published a paper which brought the nanotubes to the, world's attention—Iijima S, "Helical Microtubules of Graphitic Carbon," Nature, vol 354, 56-58, (1991). Since then there has been much work as evidenced by the scientific and patent literature on the study of these nanotubes, methods for producing them, and applications.

A variety of different synthesis methods are used to produce carbon nanotubes. The three most commonly used methods are the arc discharge, laser ablation, and chemical vapour deposition techniques. In the arc-discharge method current flows between closely spaced carbon electrodes creating an arc between them. The arc temperature is in excess of 6000 k and the electrodes reach a temperature of about 4000K at which the carbon of the electrodes strongly vaporises. Evaporation of the carbon electrodes form a vapour which condenses as nanoscale carbon fibrils or nanotubes, which are collected after the arc has been extinguished. The electrodes are usually high purity graphite rods of diameter from 3 to 15 mm. The arc discharge is created within a vacuum chamber such as a stainless steel chamber with viewing ports. The chamber is connected to a vacuum pump and a gas supply. A continuous flow of gas which is commonly helium is preferred over a static atmosphere. As the electrodes have to be adjusted during each run to create and maintain the arc a mechanism for this is required. In addition often the electrodes are cooled with water. The nanotubes are formed within the core of the electrode slag. This is collected and refined. The core generally also includes different contaminating materials (nano-onions, amorphous carbon and fullerenes) and often needs to be treated to gain product purity.

The nanotubes consist of carbon atoms mainly arranged in hexagons. There are two kinds of nanotubes: single walled nanotubes (SWNT) and multiwalled nanotubes (MWNT). Both can be grown in tangled structures or ordered close-packed structures. The mechanical and electrical properties of carbon nanotubes make them suitable for many applications: their length and flexibility makes them suitable for use as nanoscale tweezers and improves the precision of scanning probe microscopes; their ability to emit electrons has proved to be useful for many applications such as in oriented regular arrays of carbon nanotubes for operating as a flat screen colour display, in which nanotubes supply the electron beams that cause phosphor on the screen to light up; for building logic gates; for hydrogen fuel storage; and their stiffness and tensile strength may make them suitable for new composite materials.

In the arc discharge method for producing the nanotubes one or both of the electrodes may be enriched with a metallic catalyst(s). The presence of specific metal catalysts may determine whether SWNTs or MWNTs are produced, and the presence of an appropriate metal catalyst can also increase the yield of nanotubes. Ni—Co, Co—Y, Ni—Y catalysts are used in different variations.

Methods for the continuous production of carbon nanotubes are disclosed in: "A Simple Method for the Continuous Production of Carbon Nanotubes", Ishigami et al, Chemical Physics Letters 319 (2000) 457-459; "Continuous Production of Aligned Carbon Nanotubes: A Step Closer to Commercial Realisation", Andrews et al, Chemical Physics Letters 303 (1999) 467-474; and "Semi-Continuous Synthesis of Single-Walled Carbon Nanotubes via Hyrogen Arc Discharge Method", Liu et al, Carbon 37 (1999) 1865-1868 and "Continuous Production of Carbon Nanotubes by Using Moving Bed Creator", Liu et al, Chinese Chemical Letters 12 (12): 1135-1138, December 2001.

PCT patent application WO 01/85612 discloses a method in which carbon nanotubes are formed on a porous carbon substrate and in particular on carbon paper.

Cherrey et al in "Synthesis of $B_xC_yN_z$ Nanotubes", Physical Review B, Vol 51, No. 16, 15 Apr. 1995 disclose forming nanotubes of stoichiometry $BC_2N$ and $BC_3$.

SUMMARY OF INVENTION

In broad terms the invention comprises a method for producing nanoscale hollow inorganic fibrils or nanotubes, including moving a carbon-containing substrate within a reaction chamber either through an electric arc in a gap between two electrodes or past an electrode so that an electric arc exists between the electrode and the substrate, to cause the nanotubes to form on the substrate.

By "nanoscale" is meant fibrils or nanotubes of a diameter up to about 50 nanometers.

Either an arc may be formed between two electrodes and the substrate moved through the arc or alternatively the arc may exist between one electrode and the substrate, which is earthed. Another electrode may be used to initiate the arc, and may then be withdrawn leaving an arc between one electrode and the earthed substrate.

Typically one or both electrodes will be carbon electrodes such as graphite electrodes, but it may be possible that the electrodes or electrode are formed of a non-carbon material (which does not generate impurities at the reactor temperatures) and that only the substrate itself is a carbon substrate—nanotubes may be formed by the substrate itself tending to vaporise (without structural damage to the substrate) with the carbon vapour condensing back on to the fibres of the substrate as nanotubes.

The substrate may be moved at a substantially steady speed through the arc or in steps.

The substrate may be composed of carbon fibres and may comprise a tape or belt woven from carbon fibres or a paper of carbon fibres for example.

Preferably the substrate is moved at a speed such that the substrate has a residence time in the arc of at least three seconds. Preferably the substrate is moved at a speed of less than 5 mm per second.

Preferably the method includes flushing an inert gas through the reaction chamber, or an otherwise inert gas which contains a low amount of oxygen sufficient to react with other species such as carbon species without oxidising the nanotubes on cool down. Most preferably a flow of gas is directed to cool one or both of the electrodes and/or the substrate, and particularly to cool the substrate after it has passed through the arc. Alternative to the gas containing a low concentration of oxygen, the substrate after exiting the reactor chamber may be moved through an oxygen-containing gas in a separate lower temperature heating stage eg a resistive heating stage, to separately oxidise other species.

It is believed that the arc discharge takes place by an electron and ion flow between both electrodes and/or between one electrode and the substrate. Free electrons and ions are accelerated by the voltage difference between the electrodes. The electrons collide with gas atoms, leading to excitation of the atoms and causing emission of radiation. Atoms and molecules are ionised via collisions involving the electrons. Mainly $N^+$, $N_2^+$, $C_n^+$ and $C_n^-$ ions occur in the arc when the discharge is performed in nitrogen. The collisions raise the arc temperature to around 6000 K. After a couple of seconds of discharge the electrodes reach a temperature of approximately 4000K. At these temperatures the carbon of the electrodes and/or the substrate starts to vaporize strongly and a layer of carbon vapour originates adjacent to the electrode.

The method of the invention enables the continuous or at least semi continuous production of carbon nanotubes. In addition the nanotubes are attached to an underlying substrate, which is advantageous for many applications. Further preferred forms of the process can be carried out at atmospheric pressure, and the process produces nanotubes to high purity.

BRIEF DESCRIPTION OF THE FIGURES

The invention is further described with reference to the accompanying Figures by way of example wherein.

DETAILED DESCRIPTION

Figure 1:
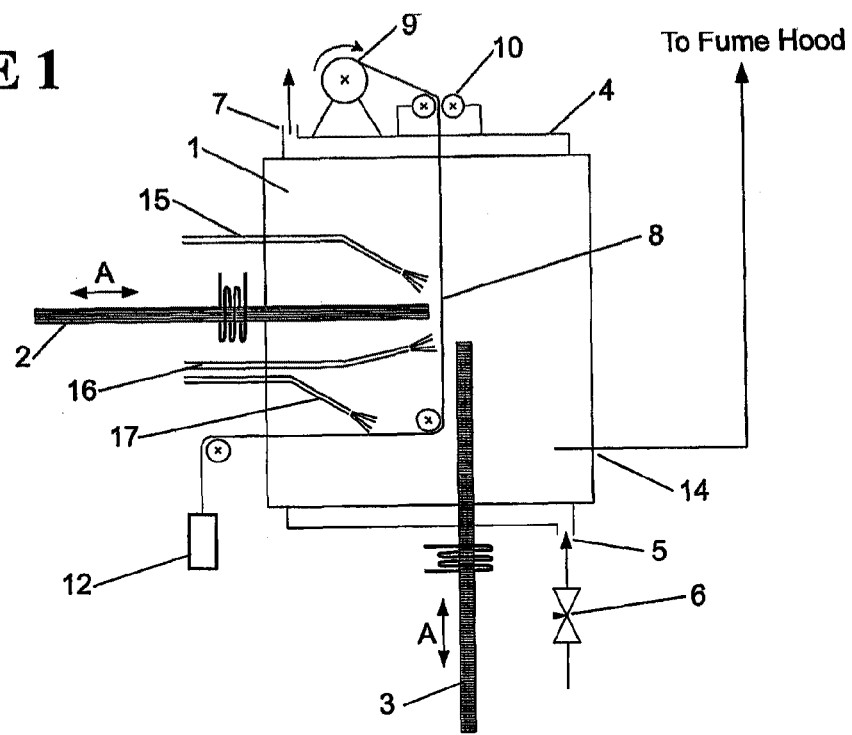
FIG. 1 schematically illustrates one form of reactor for the continuous or semi-continuous production of nanotubes according to the invention.

In FIG. 1, reference numeral 1 indicates a reactor chamber in which the discharge arc is created, which may have walls formed of brass or stainless steel or similar. Electrodes 2 and 3 project into the reactor chamber 1 and are typically mounted by electrode-feeding mechanisms as are known in the art, so that the position of electrode 3, which maybe the anode, and electrode 2, which may be the cathode (the positions of the anode and cathode may be reversed), may be adjusted to create the arc, and in operation to maintain or if required adjust the arc. Typically the reactor will have one or more viewing ports in the side wall of the reactor enabling an operator or control sensor to monitor the arc and electrode positions. The reactor chamber 1 preferably includes a surrounding water jacket 4 through which water is circulated to cool the walls of the reactor chamber during operation, or other suitable cooling system. In the reactor shown in FIG. 1 water under pressure is admitted through inlet 5 to the water jacket with the water flow being controlled by valve 6, and exits from outlet 7. A cooling system may also be arranged to cool the electrode(s).

Figure 2:
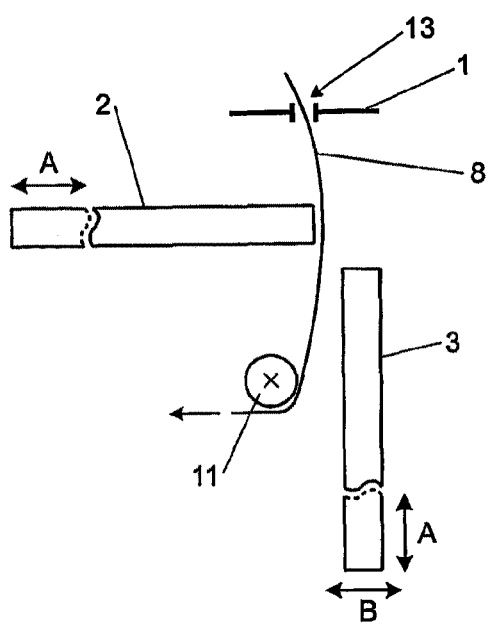
FIG. 2 is a close up schematic view of the electrodes and the substrate path between the electrodes of the reactor of FIG. 1.
Figure 3:
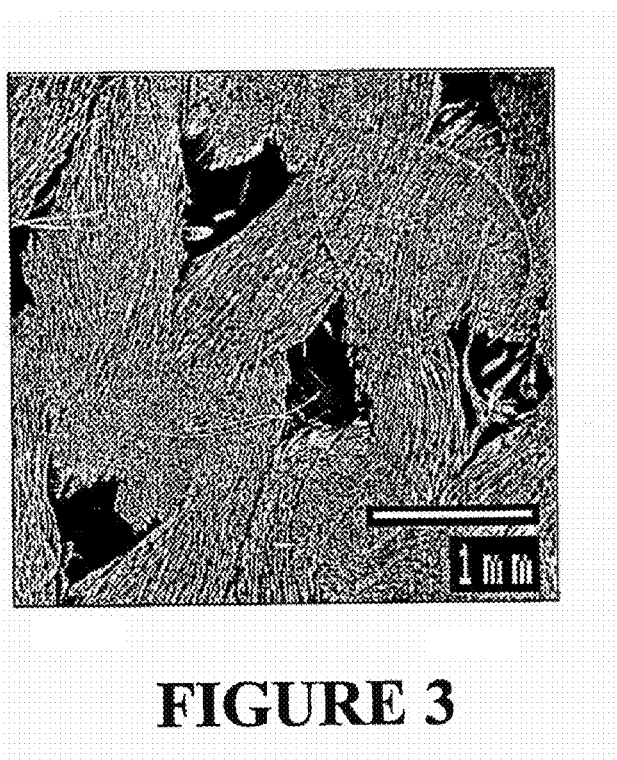
FIG. 3 is a photo micrograph of the woven carbon fibre tape used as the substrate in the work described in the subsequent example.

Carbon-substrate 8 passes between electrodes 2 and 3 and through the arc during operation of the reactor, as shown This is shown in more detail in FIG. 2. The substrate may enter the reactor chamber through a slit 13 in the top of the reactor chamber and leave through a similar exit slit in the reactor chamber on the other side of the electrodes. A mechanism is provided to feed the substrate (which is typically a high purity flat carbon tape or belt or similar) through the reactor chamber, and may be of any suitable form. For example during operation of the reactor the substrate may be unwound from a roll 9 with adjustable friction and passed between two spring loaded rollers, one of which is coupled to an electric motor with an appropriate control system. This is arranged to operate the motor to unwind the substrate at a slow constant speed during a production run, or which enables an operator to vary the speed at which the substrate is unwound with an appropriate control system. In another arrangement the substrate unwind system may be arranged to move the substrate through the arc in steps by stepping an electric motor which controls unwinding of the substrate, so that the substrate is stationary in the arc for a few seconds, before being stepped on to bring the next portion of the substrate into the arc, before being stepped on again etc. A speed which causes the substrate to move through the arc with a residence time in the arc of 3 seconds or more has been found suitable, and typically 3 to 10 seconds, whether the substrate is moved at a steady speed or in steps, but the substrate speed and residence time of the substrate in the arc are adjusted to achieve the desired formation of nanotubes on the substrate for the current, tape dimension, electrode dimensions etc. which are employed in any situation.

Referring again to FIG. 1 in the example shown the substrate 8 after passing through the arc passes around rollers 11, and is suitably collected after exit from the reactor. In FIG. 1 weight 12 schematically illustrates that the substrate is kept under moderate tension as it passes through the reactor.

During operation the interior of the reactor is preferably at or slightly above atmospheric pressure, and the gas flow exiting the reactor from outlet 14 (and the substrate inlet and outlet slits) is extracted via a fume hood or similar. An inert gas such as nitrogen, argon or helium for example is flushed through the reaction chamber, and it is preferred this is done by directing a gas flow towards one or both of the electrodes or the substrate to also cool the electrodes and the substrate, as schematically illustrated by gas outlet 15 in FIG. 1. Additionally or alternatively a gas flow may also be directed to flush away carbon vapour and/or cool the substrate after it has passed through the arc, as schematically illustrated by gas outlets 16 and/or 17. The cooling of outlet 15 assists in avoiding burn-through of and structural damage to the substrate by the arc, whereas the operation of outlets 16 and 17 serve to control oxidation.

The electrode feed mechanisms and the roller 11 within the reaction chamber are both preferably also water cooled. The anode as well as the roller 11 which the tape contacts are preferably earthed. Any take up mechanism for collecting the substrate after it has passed through the reactor chamber is also preferably earthed, as is also the reactor shell.

Referring to FIG. 2, it may be preferable for one electrode, which in the figure is the anode, to be positioned to impinge on the substrate such that the substrate is tensioned against that electrode as the substrate moves past it as schematically shown.

The substrate may be of any desired type on which it is found that nanotubes will form but it is believed that best results may be achieved with a substrate composed of carbon fibres such as a tape or belt woven from carbon fibres or a paper of carbon fibres for example. Very preferably the substrate and the electrodes have a very high carbon purity since any impurities which will vaporise at the temperatures within the reactor may affect the formation of nanotubes adversely or tend to deposit on the nanotubes formed on the substrate, which is undesirable. In particular it is very desirable to avoid hydrocarbon impurities which can be released as gases on heating, to avoid significant soot formation. Typically the electrodes and substrate should have a carbon purity in excess of 99% and preferably in excess of 99.95%.

The current density should be sufficiently low to avoid structural damage to the substrate (ie damage which would significantly affect the structural integrity of the substrate) but sufficient to achieve a current density at the contact point of the arc on the substrate (and the arc tends to spread at the contact point on the substrate) which is sufficient to form nanotubes on the substrate. The current density may be sufficient to cause some vaporisation of the substrate (again without structurally damaging the substrate). Typically the current density may be in the range 0.1 to 1 Amps/mm$^2$ for example. It is an advantage of the method of the invention that the arc tends to spread over the substrate (this may be due to nanotubes forming on the substrate acting as collectors/emitters for charge carriers in the arc), which is advantageous to forming nanotubes over as broad an area of the substrate as possible.

It is preferred that gas flushed through the reactor chamber contains sufficient oxygen to react with other carbon species present without oxidising the carbon nanotubes which are formed, on cool down. Oxygen concentrations of about 3500 and 6000 ppm have been found effective. If oxygen is present at too high a level the nanotubes themselves become oxidised on cool down.

The method may be carried out in the presence of an introduced catalyst to increase yield or to promote the formation of SWNTs for example. Suitable catalysts may be metal catalysts such as Ni—Co, Co—Y, Ni—Y catalysts or alternatively lower cost catalysts such as Fe or B catalysts for example.

The power supply should have minimal voltage and current ripple, and in particular should have a peak to peak ripple of less than one volt and less than 0.5 Amps. It has been found that nanotubes may not form with higher levels of ripple.

The invention has been described above with reference to forming carbon nanotubes but the method of the invention may also be applied to forming nanotubes from other inorganic materials such as nanotubes of $BC_2N$ and/or $BC_3$ for example. To form nanotubes of $BC_2N$ and/or $BC_3$ an electrode may contain boron nitride, or an electrode may contain boron and a nitrogen containing gas may be passed through the reactor, for example. $BC_2N$ and/or $BC_3$ nanotubes will deposit on the substrate.

The invention is further illustrated by the following example:

EXAMPLE

UVIS TR-3/2-22 woven carbon fibre tape manufactured by Carbonics GmbH, Germany was used as a substrate. The tape has a knitted weave, the specific weight of the tape was 770 g/m$^2$, its thickness was 2 mm, and a carbon content of 99.9%. The tape was cut into strips of width 30 mm.

The tape strips were unwound into a reactor similar to that described with reference to FIGS. 1 and 2, from a roller between two driving wheels and then through an inlet slot in the top of the reactor into the reaction chamber. The tape exited the reactor through an outlet slot. The electrodes were graphite electrodes of 7.66 mm in diameter (anode) and 6.05 mm diameter (cathode). The electrode position was set while the reactor was open during setup. When setting the electrode position the anode (aligned horizontally) was moved forward until it contacted and pushed against the tape. The distance between the electrode tips was set to about 5-8 mm.

During operation the reactor was flushed with nitrogen or a nitrogen-air mixture at a rate set to 10 L/min, and cooling water was circulated through cooling coils around the electrode supports. To strike the arc, the anode with the tape running over it was moved forward until the discharge took place, then the anode was withdrawn slightly to establish the arc. The current was set to approximately 10 A and the voltage reached approximately 60 V. After the electrodes had heated up for roughly one minute a motor feeding the tape through the reactor was started. The tape was fed through in one run at a speed of 2.1 mm/second and in another run the tape was fed through at a speed of 1.8 mm/second.

For the 2.1 mm/second run additional cooling gas was introduced to cool the tape close to the arc attachment zone (as shown in FIG. 1). Cooling gas before the tape exits the reactor was switched on for both runs. After the desired length of the carbon tape had been run through the reactor the discharge was stopped by shutting off the power supply. Gas was flushed through the reactor for a further five minutes to remove exhaust gases.

The tape samples were examined with a JEOL JSM 6100 scanning electron microscope. Nanotubes were found on the tape from both runs. The nanotubes appear as whiskers deposited on the fibres of the carbon tape.

Figure 4:
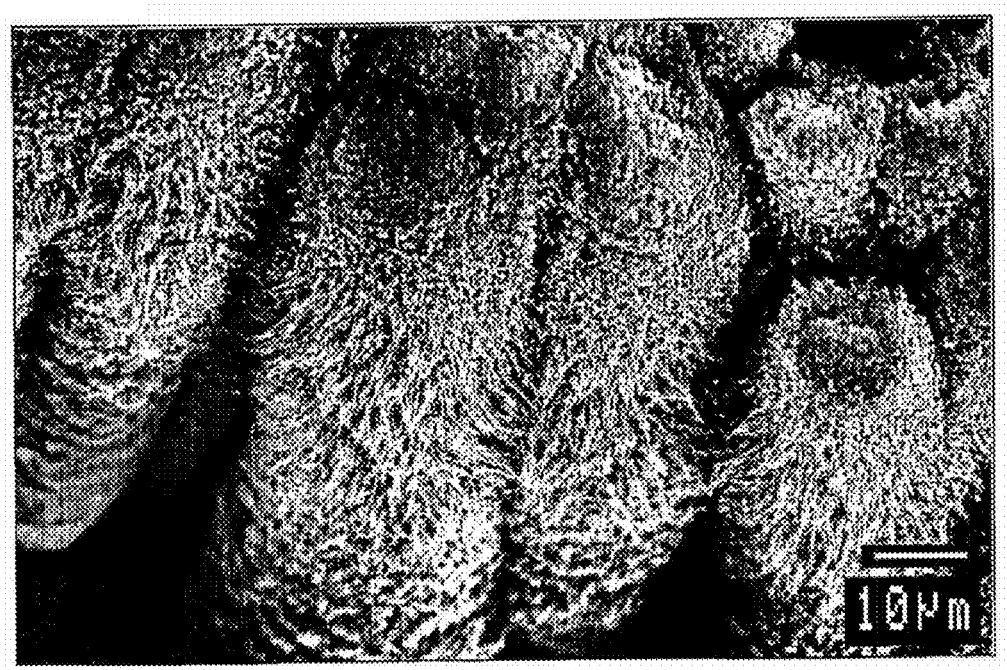
FIG. 4 is a photomicrograph showing fibres of the tape covered with nanotubes produced in the work described in the subsequent example.
Figure 5:
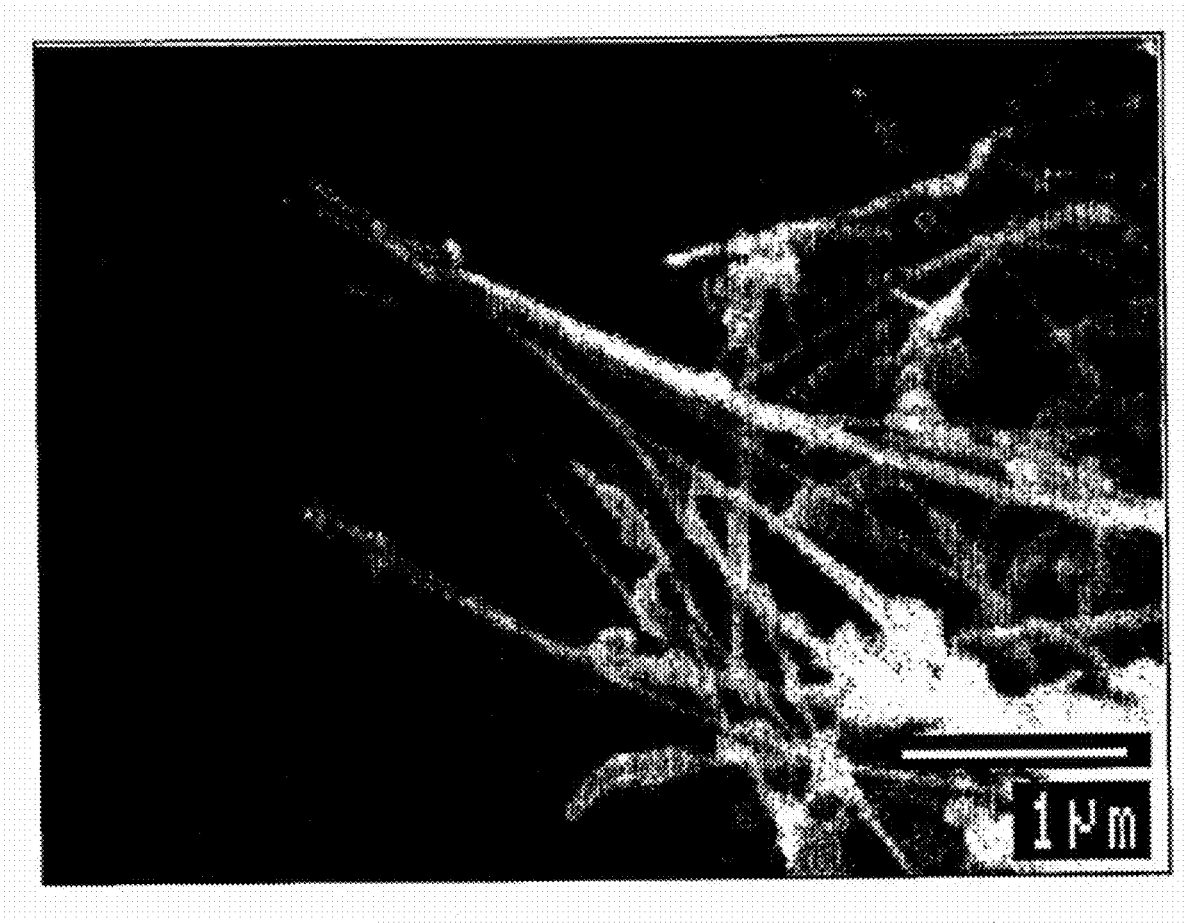
FIG. 5 is a view with greater enlargement of the nanotubes grown on the carbon tape.

FIG. 4 has a portion of the tape from a run in which the tape was moved in steps. The carbon nanotubes are shown in a much higher magnification in FIG. 5. The diameter of the nanotubes is between 25 and 50 nm. Judging from the diameter they are likely to be multiwalled. Their length is between 5 and 10 μm (in FIG. 5 the whole length is not visible).

The foregoing describes the invention including preferred forms thereof and alterations and modifications as will be obvious to one skilled in the art are intended to be incorporated in the scope thereof as defined in the accompanying claims.

The invention claimed is:

1. A method for producing nanoscale hollow inorganic fibrils or nanotubes, comprising moving a carbon-containing substrate within a reaction chamber either through an electric arc in a gap between two electrodes or adjacent an electrode so that an electric arc exists between the electrode and the substrate, with an arc current sufficiently low to cause the nanotubes to form on the substrate by vaporization of the substrate, but without the arc destroying the substrate, as the substrate moves through the arc completely.

2. A method according to claim 1 including moving the substrate at a substantially steady speed through the arc.

3. A method according to claim 1 including moving the substrate through the arc in steps.

4. A method according to claim 1 wherein at least one electrode is a carbon containing electrode.

5. A method according to claim 4 wherein the substrate is composed of carbon fibres.

6. A method according to claim 5 wherein the substrate is a tape or belt woven from carbon fibres.

7. A method according to claim 5 wherein the substrate is a paper of carbon fibres.

8. A method according to claim 1 including tensioning the substrate against the anode of the electrodes.

9. A method according to claim 1 including moving the substrate at a speed such that the substrate has a residence time in the arc of at least three seconds.

10. A method according to claim 1 including moving the substrate at a speed of less than 5 mm per second.

11. A method according to claim 1 wherein the arc current is sufficiently low to form nanotubes on the substrate but avoid structural damage to the substrate.

12. A method according to claim 1 wherein the arc current is set at a level which causes some vaporisation of the substrate without structurally damaging the substrate.

13. A method according to claim 1 wherein the arc has a current density in the range 0.1 to 1 Amps/mm$^2$.

14. A method according to claim 1 wherein a catalyst is present which will favour the production of single wall nanotubes.

15. A method according to claim 1 including flushing a gas through the reaction chamber which contains sufficient oxygen to react with other species without oxidising the nanotubes on cool down.

16. A method according to claim 1 including directing a flow of gas to cool one or both of the electrodes and/or the substrate.

17. A method according to claim 1 including directing a flow of gas onto the substrate after it has passed through the arc to cool the substrate and/or clear it of carbon vapour.

18. A method according to claim 1 wherein the nanotubes are carbon nanotubes.

19. A method according to claim 1 wherein the electrodes and the substrate have a carbon purity in excess of 99.5%.

20. A method according to claim 1 wherein the nanotubes are composed of $BC_2N$ and/or $BC_3$.

21. The method according to claim 1 wherein one of the two electrodes is a carbon containing electrode and the nanotubes are also formed on the substrate by vaporization of one of the two electrodes.

22. The method according to claim 21 wherein both of the two electrodes are carbon containing electrodes and the nanotubes are also formed on the substrate by vaporization of both of the two electrodes.

23. The method according to claim 1 wherein the electrode is a carbon containing electrode and the nanotubes are also formed on the substrate by vaporization of the electrode.

24. A method according to claim 1 wherein a power supply which supplies the arc current has a rms voltage ripple of less than 1 volt and current ripple of less than 0.5 Amps.

25. A method of producing nanoscale hollow carbon fibrils or nanotubes, comprising moving a tape or belt composed of carbon fibres or filaments having a carbon purity in excess of 99.5% through an electric arc in a gap between two carbon containing electrodes having a carbon purity in excess of 99.5% at a speed sufficient relative to the arc current to form carbon nanotubes on the fibres or filaments of the tape or belt by vaporization of the tape or belt, but without structurally damaging the tape or belt.

26. The method according to claim 25 wherein the nanotubes are also formed on the substrate by vaporization of one of the two electrodes.

27. A method for producing nanoscale hollow inorganic fibrils or nanotubes, comprising moving within a reaction chamber a substrate comprising a flexible tape or belt comprising carbon fibres, either through an electric arc in a gap between two electrodes or adjacent an electrode so that an electric arc exists between the electrode and the substrate with the arc current sufficiently low to cause some vaporisation of the substrate, but without the arc completely destroying the substrate, and subsequent formation of carbon nanotubes on the substrate continuously as the substrate moves.

28. A method according to claim 27 including moving the substrate at a substantially steady speed through the arc.

29. A method according to claim 27 wherein the arc has a current density in the range 0.1 to 1 Amps/mm$^2$.

30. The method according to claim 27 wherein one of the two electrodes is a carbon containing electrode and the nanotubes are also formed on the substrate by vaporization of one of the two electrodes.

31. The method according to claim 30 wherein both of the two electrodes are carbon containing electrodes and the nanotubes are also formed on the substrate by vaporization of both of the two electrodes.

32. The method according to claim 27 wherein the electrode is a carbon containing electrode and the nanotubes are also formed on the substrate by vaporization of the electrode.

* * * * *